(12) United States Patent
Sugiura et al.

(10) Patent No.: US 6,973,582 B2
(45) Date of Patent: Dec. 6, 2005

(54) AUDIO SIGNAL OUTPUT DEVICE IN WHICH OPTICAL SIGNALS ARE NOT OUTPUT WHEN A PLUG IS NOT CONNECTED TO AN S/PDIF OUTPUT TERMINAL

(75) Inventors: Atsuko Sugiura, Tokyo (JP); Naoya Ishii, Tokyo (JP); Takashi Taga, Niigata (JP); Toshiaki Uotani, Niigata (JP)

(73) Assignee: NEC Corporation, Tokyo (JP)

( * ) Notice: Subject to any disclaimer, the term of this patent is extended or adjusted under 35 U.S.C. 154(b) by 495 days.

(21) Appl. No.: 10/208,875

(22) Filed: Aug. 1, 2002

(65) Prior Publication Data
US 2004/0025062 A1   Feb. 5, 2004

(30) Foreign Application Priority Data
Aug. 3, 2001  (JP) ............................. 2001-236729

(51) Int. Cl.$^7$ .............................................. G02B 6/42
(52) U.S. Cl. ...................... 713/320; 713/323; 713/324; 385/56; 385/79
(58) Field of Search .............................. 713/320, 323, 713/324; 385/56, 79

(56) References Cited
U.S. PATENT DOCUMENTS

| | | | |
|---|---|---|---|
| 6,061,493 A * | 5/2000 | Gilliland et al. ............ | 385/140 |
| 6,527,450 B1 * | 3/2003 | Miyachi et al. ............... | 385/56 |
| 6,588,941 B2 * | 7/2003 | Yasuda ........................ | 385/79 |
| 6,692,287 B2 * | 2/2004 | Yasuda ........................ | 439/352 |
| 6,709,166 B1 * | 3/2004 | Miyachi et al. ............... | 385/56 |
| 2002/0046355 A1 * | 4/2002 | Takeuchi ..................... | 713/320 |
| 2002/0093886 A1 * | 7/2002 | Ijichi et al. ............... | 369/30.09 |
| 2003/0200186 A1 * | 10/2003 | Abrahams ..................... | 706/11 |
| 2003/0235379 A1 * | 12/2003 | Lin ............................ | 385/101 |

FOREIGN PATENT DOCUMENTS

| | | | |
|---|---|---|---|
| JP | 7-141059 | | 6/1995 |
| JP | 10-31539 | | 2/1998 |
| JP | 10-199153 | | 7/1998 |
| JP | JP11133275 | * | 5/1999 |
| JP | 2001-27915 | | 1/2001 |
| JP | 2001-176611 | | 6/2001 |

* cited by examiner

*Primary Examiner*—A. Elamin
(74) *Attorney, Agent, or Firm*—McGinn IP Law Group, PLLC

(57) ABSTRACT

An audio signal output device is disclosed in which optical signals are not output when a plug is not connected to an S/PDIF output terminal. When a plug is not connected to the S/PDIF output terminal, a fitting metal part does not contact a detection pin, and a connection detection signal is therefore 12V. As a result, a PNP transistor and an n-channel MOS transistor are both OFF, a power supply voltage of 5 V is not supplied to a drive IC, and optical signals are not output.

8 Claims, 3 Drawing Sheets

AUDIO SIGNAL OUTPUT DEVICE IN WHICH OPTICAL SIGNALS ARE NOT OUTPUT WHEN A PLUG IS NOT CONNECTED TO AN S/PDIF OUTPUT TERMINAL

BACKGROUND OF THE INVENTION

1. Field of the Invention

The present invention relates to an audio signal output device of, for example, an information processor such as a personal computer, a CD player, or an MD player that includes a digital signal output terminal such as an S/PDIF output terminal for transmitting audio signals as digital signals.

2. Description of the Related Art

In recent years, commercial digital audio equipment such as CD players, MD players, and DAT players have been developed that are provided with S/PDIF (Sony/Philips Digital Interface Format) terminal for transferring audio signals as digital signals. This S/PDIF is a digital audio interface that is principally used in commercial digital audio equipment, and internationally, conforms to the IEC 60958 (previously IEC 958) standards of the IEC, and in Japan, conforms to the CP-1201 (previously CP-340) standards of the EIAJ.

When an audio signal is to be transferred between two devices that have such an S/PDIF terminal, the transfer of digital signals can be achieved by connecting the S/PDIF output terminals and S/PDIF input terminals of the two devices using optical fiber cables or coaxial cables. These S/PDIF terminals can be used to transfer the audio signals as digital signals without alteration, and the occurrence of degradation of sound quality that accompanies transfer between the devices can thus be prevented.

In addition, many personal computers in recent years are provided with the capability to reproduce and edit audio signals such as music, and some of these personal computers are therefore equipped with S/PDIF output terminals as with audio devices.

Furthermore, recent years have seen the capability to distribute music by way of a network such as the Internet, and networkable music reproduction devices have been proposed that can receive music information by way of such networks and reproduce the music information.

We now refer to FIGS. 1*a* and 1*b*, in which is shown an external view of a networkable music reproduction device that is an example of such an information processor having a digital signal output terminal. FIG. 1*a* is a front view of the networkable music reproduction device, and FIG. 1*b* is a rear view of the networkable music reproduction device. As shown in FIG. 1*b*, S/PDIF output terminal 10 is provided on the rear surface of this networkable music reproduction device.

We next refer to FIG. 2, in which is shown a circuit diagram of a prior-art circuit for generating an optical signal that is output from this S/PDIF output terminal 10.

In this S/PDIF output terminal 10, LED2, which is a means for generating optical signals, is provided inside jack 1 for connecting the plug of an optical fiber cable. Further, drive IC 3 is provided in S/PDIF output terminal 10 for controlling this LED 2 based on S/PDIF signal 100 that has been applied as input.

In this circuit of the prior art, a voltage of 5 V is applied as the power supply to drive IC 3 whether or not the plug is connected. Accordingly, a red optical signal is output from LED 2 even when a plug is not inserted in jack 1.

This output of an optical signal from LED 2 even when a plug is not connected to the S/PDIF output terminal results in unnecessary power consumption. There is the additional possibility that the user may mistake this leakage of the red optical signal from S/PDIF output terminal 10 for malfunction or breakdown of the device. In particular, as personal computers become smaller and lighter, information processors having digital signal output terminals will be more frequently carried about, meaning that the probability that people will see more than the front surface of the device will increase, and the leakage of red optical signals will become more noticeable.

To prevent such problems, the S/PDIF output terminal can be covered with a cap when not in use to prevent the leakage of the optical signals to the outside. However, when an information processor or audio signal output device having a digital signal output terminal is moved around, the frequent insertion and removal of the optical fiber cable may result in the loss of the cover, or the annoyance of constantly removing or replacing the cover may result in its not being used at all. As a result, the possibility for a user to be confused by the leakage of optical signals cannot be prevented simply by providing a cover. In addition, the simple provision of a cover is obviously no countermeasure for the unnecessary consumption of power.

SUMMARY OF THE INVENTION

It is an object of the present invention to provide an information processor and an audio signal output device in which optical signals are not output from a digital signal output terminal when a plug is not connected to the digital signal output terminal.

To achieve the above-described object, an information processor or audio signal output device having a digital signal output terminal of the present invention includes: an optical signal generating means, a drive means, a detection means, and a power supply cutoff means.

The drive means controls the optical signal generation means based on received digital signals. The detection means detects whether or not a plug is connected to the digital signal output terminal. The power supply cutoff means cuts off the power supply to the drive means when the detection means detects that a plug is not connected to the digital signal output terminal.

According to the present invention, the power supply cutoff means cuts off the power supply voltage to the drive means when a plug is not connected to the digital signal output terminal, whereby the output of optical signals from the digital signal output terminal can be prevented. The present invention therefore can prevent the possibility that a user may mistake the output of optical signals for a malfunction or breakdown of the device, and further, can prevent unnecessary consumption of power.

In addition, the above-described power supply cutoff means may be constituted by: a PNP transistor having a base that receives a connection detection signal that indicates whether or not a plug is connected to the digital signal output terminal, and an emitter that is connected to a high-level voltage; a pull-up resistance for pulling up the connection detection signal to a high-level voltage, and an n-channel MOS transistor having its gate connected to the collector of the PNP transistor, its drain connected to the power supply voltage, and its source connected to the power supply input terminal of the drive means.

Further, as the detection means, a detection pin may be used that is connected to the connection detection signal and that, by being connected to a low-level voltage and by contacting a fitting metal part that is provided for fitting with said pin, sets said connection detection signal to a low level when a plug is inserted in the jack of the digital signal output terminal.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1A:
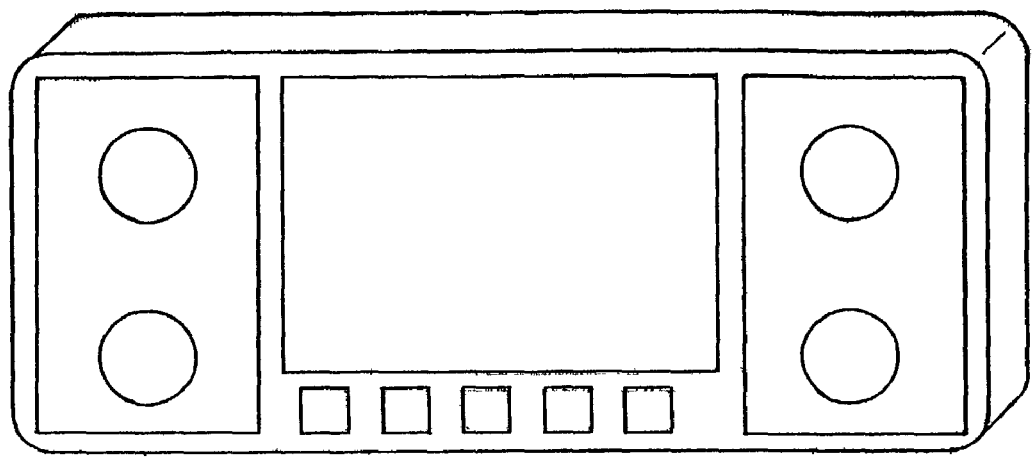
FIG. 1a is a front view of a networkable music reproduction device.
Figure 1B:
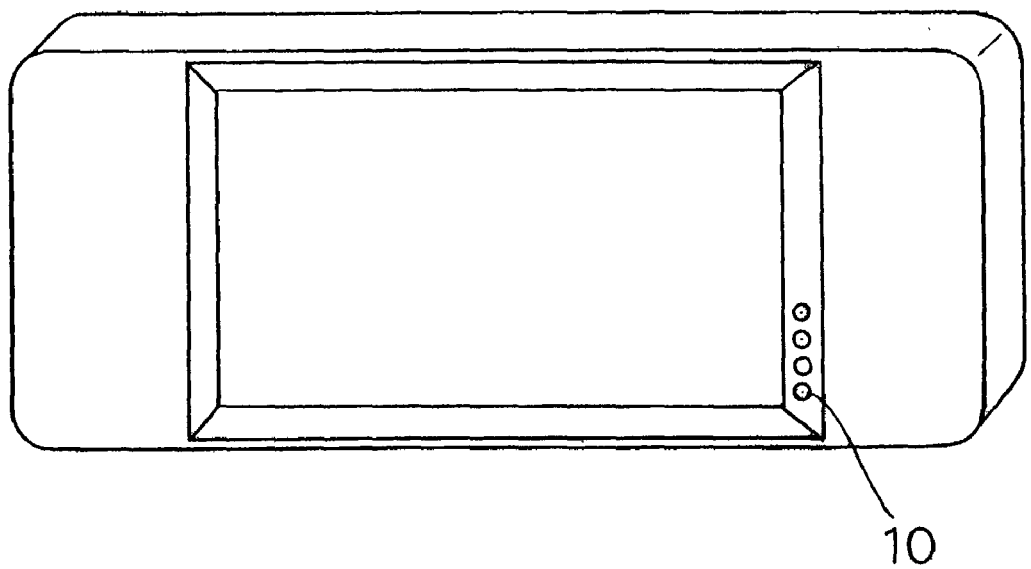
FIG. 1b is a rear view of the networkable music reproduction device.
Figure 2:
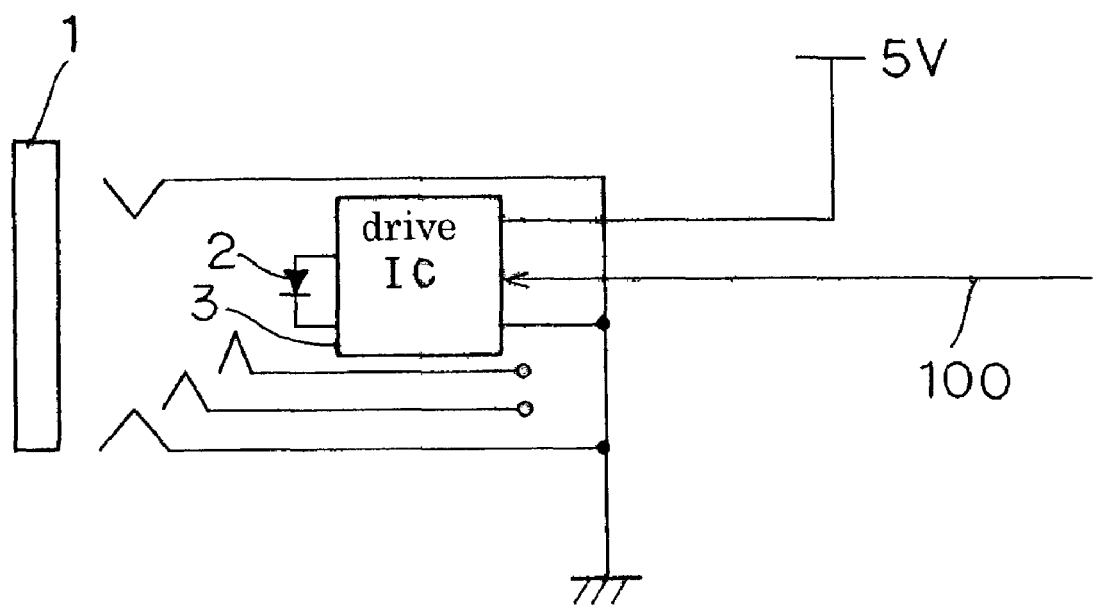
FIG. 2 is a circuit diagram of a circuit for generating optical signals that are output from an S/PDIF output terminal in an audio signal output device having an S/PDIF output terminal of the prior art.
Figure 3:
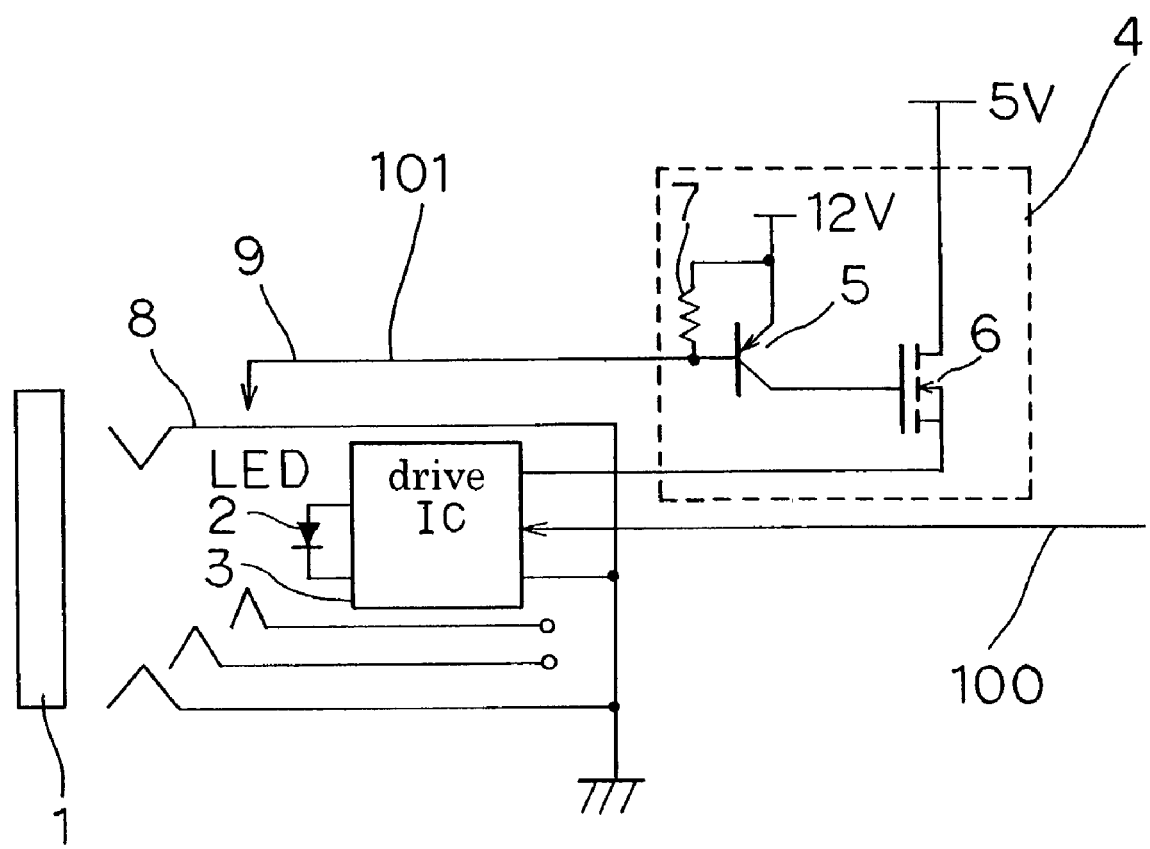
FIG. 3 is a circuit diagram of a circuit for generating an optical signal that is output from an S/PDIF output terminal in an audio signal output device having an S/PDIF output terminal of an embodiment of the present invention.

We first refer to FIG. 3, in which is shown a circuit diagram of a circuit for generating optical signals that are output from an S/PDIF output terminal in an audio signal output device having an S/PDIF output terminal of an embodiment of the present invention. Constituent elements of FIG. 3 that are identical to constituent elements of FIG. 2 are identified by the same reference numbers and explanation of these elements is here omit.

Physically, types of S/PDIF include those that employ a coaxial cable of 75 (having an RCA or BNC connector) and those that employ an optical fiber, the present embodiment being for the type of S/PDIF that employs an optical fiber.

The present embodiment is a device in which detection pin 9, which is a detection means for detecting whether or not a plug is connected to the S/PDIF output terminal, and power supply cutoff circuit 4 for cutting off the power supply to drive IC 3 when it is detected by this detection means that a plug is not connected to the S/PDIF output terminal, are additionally provided in the circuit of the prior-art device shown in FIG. 2.

In the present embodiment, power supply cutoff circuit 4 is constituted by PNP transistor 5, n-channel MOS transistor 6, and pull-up resistor 7.

Pull-up resistor 7 pulls up the voltage of connection detection signal 101 to a high-level voltage of 12 V. Connection detection signal 101 is applied to the base of PNP transistor 5, and the emitter of PNP transistor 5 is connected to a voltage of 12 V. N-channel MOS transistor 6 has its gate connected to the collector of PNP transistor 5, its drain connected to the power supply voltage of 5 V, and its source connected to the power supply input terminal of drive IC 3.

When a plug is inserted into jack 1 of S/PDIF output terminal 10, fitting metal part 8 contacts detection pin 9 and connection detection signal 101 is set to low level. In other words, connection detection signal 101 is 0 V when a plug is connected to S/PDIF output terminal 10 and is 12 V when a plug is not connected and thus can function as a signal that indicates whether or not a plug is connected to S/PDIF output terminal 10.

The operation of the circuit in an audio signal output device having an S/PDIF output terminal in this embodiment is next explained in detail with reference to FIG. 3.

Explanation first regards the state when a plug is not connected to S/PDIF output terminal 10. In this case, fitting metal part 8 does not contact detection pin 9, and connection detection signal 101 is therefore pulled up to the high level of 12 V by pull-up resistor 7. PNP transistor 5 is therefore OFF, and n-channel MOS transistor 6 is also OFF, and the power supply voltage of 5 V is therefore not supplied to drive IC 3.

Next, regarding the state when a plug is connected to S/PDIF output terminal 10, fitting metal part 8 contacts detection pin 9, whereby connection detection signal 101 becomes the low level of 0 V. As a result, PNP transistor 5 turns ON and a voltage of 12 V is applied to the gate of n-channel MOS transistor 6. N-channel MOS transistor 6 therefore turns ON, and a power supply voltage of 5 V is supplied to drive IC 3.

According to the present embodiment, the power supply voltage to drive IC 3 is cut off by power supply cutoff circuit 4 when a plug is not connected to the S/PDIF output terminal 10 by means of the above-described operation, and the output of optical signals from S/PDIF output terminal 10 can therefore be prevented. The present embodiment thus can both prevent the user from mistaking the output of optical signals for a malfunction or breakdown of the device, and also prevent unnecessary consumption of electrical power.

In power supply cutoff circuit 4 in the present embodiment, a bipolar transistor is used as the transistor that is subjected to ON/OFF control based on connection detection signal 101 while an FET is used as the transistor for switching the power supply voltage of 5 V. This composition is adopted because an FET has a noise characteristic that is superior to that of a bipolar transistor, and noise that is included in the power supply voltage that is applied to drive IC 3 should be reduced to a minimum.

Although a case was described in the present embodiment in which power supply cutoff circuit 4 that is constituted by PNP transistor 5, n-channel MOS transistor 6, and pull-up resistor 7 was employed as the power supply cutoff means for cutting off the power supply to drive IC 3, the present invention is not limited to this circuit configuration, and any circuit may be employed that can cut off the power supply to drive IC 3 when it is detected that a plug is not connected to S/PDIF output terminal 10.

Although a case was described in the present embodiment in which detection pin 9 was used as a detection means for detecting whether or not a plug is connected to S/PDIF output terminal 10, this detection pin 9 being connected to connection detection signal 101 and setting connection detection signal 101 to 0 V by contact with fitting metal part 8 when the plug of an optical fiber cable is inserted in jack 1 of S/PDIF output terminal 10. However, the present invention is not limited to this form, and any mechanical or electrical means may be used that enables detection of whether or not a plug is connected to S/PDIF output terminal 10.

Although the present embodiment was described using a networkable music reproduction device as one example of an information processor having a digital signal output terminal, the present information is not limited to this form, and the present invention can be similarly applied to any device that is an information processor having a digital signal output terminal such as a personal computer, CD player, MD player, or a DAT player.

While a preferred embodiment of the present invention has been described using specific terms, such description is for illustrative purposes only, and it is to be understood that changes and variations may be made without departing from the spirit or scope of the following claims.

What is claimed is:

1. An information processor including a digital signal output terminal, said information processor comprising:
    optical signal generation means;
    drive means for controlling said optical signal generation means based on received digital signals;
    detection means for detecting whether or not a plug is connected to said digital signal output terminal; and
    power supply cutoff means for cutting off the power supply to said drive means when said detection means has detected that a plug is not connected to said digital signal output terminal,
    wherein said power supply cutoff means comprises:
        a PNP transistor including a base that receives a connection detection signal that indicates whether or not a plug is connected to said digital signal output terminal and an emitter that is connected to a high-level voltage;
        a pull-up resistor for pulling up said connection detection signal to a high-level voltage; and
        an n-channel MOS transistor including a gate connected to the collector of said PNP transistor, a drain connected to a power supply voltage, and a source connected to the power supply input terminal of said drive means.

2. An information processor according to claim 1, wherein said detection means comprises a detection pin that is connected to said connection detection signal and that, by being connected to a low-level voltage and by contacting a fitting metal part that is provided for fitting with said plug, sets said connection detection signal to a low level when a plug is inserted in the jack of said digital signal output terminal.

3. An information processor according to claim 1, wherein said digital signal output terminal comprises an S/PDIF output terminal.

4. An information processor according to claim 2, wherein said digital signal output terminal comprises an S/PDLF output terminal.

5. An audio signal output device including a digital signal output terminal, said audio signal output device comprising:
    an optical signal generation means;
    a drive means for controlling said optical signal generation means based on a received digital signal;
    a detection means for detecting whether or not a plug is connected to said digital signal output terminal; and
    a power supply cutoff means for cutting off the power supply to said drive means when said detection means has detected that a plug is not connected to said digital signal output terminal,
    wherein said power supply cutoff means comprises:
        a PNP transistor including a base that receives a connection detection signal that indicates whether or not a plug is connected to said digital signal output terminal, and an emitter that is connected to a high level voltage;
        a pull-up resistor for pulling up said connection detection signal to a high-level voltage; and
        an n-channel MOS transistor including a gate connected to the collector of said PNP transistor, a drain connected to the power supply voltage; and a source connected to the power supply input terminal of said drive means.

6. An audio signal output device according to claim 5, wherein said detection means comprises a detection pin that is connected to said connection detection signal and that, by being connected to a low-level voltage and by contacting a fitting metal part that is provided for fitting with said plug, sets said connection detection signal to low level when a plug is inserted in the jack of said digital signal output terminal.

7. An audio signal output device according to claim 5, wherein said digital signal output terminal comprises an S/PDIF output terminal.

8. An audio signal output device according to claim 6, wherein said digital signal output terminal comprises an S/PDIF output terminal.

* * * * *